United States Patent
Tiburzio et al.

(10) Patent No.: US 12,247,265 B2
(45) Date of Patent: Mar. 11, 2025

(54) SOLID AGGLOMERATED PRODUCT BASED ON IRON OXIDES AND CORRESPONDING PRODUCTION METHOD

(71) Applicant: DANIELI & C. OFFICINE MECCANICHE S.P.A., Buttrio (IT)

(72) Inventors: Selena Tiburzio, Cervignano del Friuli (IT); Liliana Florina Arsene, Buttrio (IT); Luca Tommasi, Ronchi dei Legionari (IT); Alessandra Primavera, Faedis (IT)

(73) Assignee: DANIELI & C. OFFICINE MECCANICHE S.P.A., Buttrio (IT)

( * ) Notice: Subject to any disclaimer, the term of this patent is extended or adjusted under 35 U.S.C. 154(b) by 112 days.

(21) Appl. No.: 17/280,706

(22) PCT Filed: Sep. 25, 2019

(86) PCT No.: PCT/IT2019/050209
§ 371 (c)(1),
(2) Date: Mar. 26, 2021

(87) PCT Pub. No.: WO2020/065691
PCT Pub. Date: Apr. 2, 2020

(65) Prior Publication Data
US 2024/0287640 A1    Aug. 29, 2024

(30) Foreign Application Priority Data
Sep. 27, 2018  (IT) .................. 102018000008995

(51) Int. Cl.
*C22B 1/243* (2006.01)
*C21B 11/10* (2006.01)

(52) U.S. Cl.
CPC .............. *C22B 1/243* (2013.01); *C21B 11/10* (2013.01)

(58) Field of Classification Search
CPC ................................... C22B 7/02; C22B 7/04
See application file for complete search history.

(56) References Cited

U.S. PATENT DOCUMENTS

2004/0025633 A1* 2/2004 Kanoshima ............. C21B 5/007
75/460

FOREIGN PATENT DOCUMENTS

| EP | 0 976 843 A1 | 2/2000 |
| JP | 2008 095177 A | 4/2008 |

OTHER PUBLICATIONS

International Search Report and Written Opinion from PCT/IT2019/050209 dated Jan. 3, 2020 (10 pages).

* cited by examiner

*Primary Examiner* — Ricardo D Morales
(74) *Attorney, Agent, or Firm* — Calfee, Halter & Griswold LLP

(57) ABSTRACT

Solid agglomerated product, usable as a charge material for an electric arc furnace, comprises at least one fraction of by-product deriving from a steel plant and which comprises a first part containing ferrous oxide FeO and a second part containing ferric oxide $Fe_2O_3$, a fraction of solid fuel (CR) containing a quantity of carbon and at least one inorganic binder to agglomerate a fraction of by-product and the fraction of solid fuel with each other and give the agglomerated product the required mechanical properties. The inorganic binder at least partly comprises slag.

18 Claims, 2 Drawing Sheets

SOLID AGGLOMERATED PRODUCT BASED ON IRON OXIDES AND CORRESPONDING PRODUCTION METHOD

CROSS-REFERENCE TO RELATED APPLICATIONS

This application is a 371 of PCT Application No. PCT/IT2019/050209 filed on Sep. 25, 2019, which claims priority to Italian Application No. 102018000008995 filed on Sep. 27, 2018, the contents of which are hereby incorporated by reference as if recited in their entirety.

FIELD OF THE INVENTION

The present invention concerns solid agglomerated products based on iron oxides and a corresponding production method.

In particular, the agglomerated products, according to the present invention, can be used to feed electric arc furnaces, in order to recover the iron contained therein.

BACKGROUND OF THE INVENTION

In the iron and steel and metallurgical field, different types of by-products of iron working and steel production are known, generally considered as industrial scrap or waste.

These by-products mainly comprise iron oxides, as well as other residues.

By way of example only, these residues from working iron can be fines from iron oxide pelletizing plants, blast furnace dust, dust and fines from steel plants, mill scales, fines from direct reduction plants.

These by-products, based on their size, can generally be grouped into two macro groups:
- a fine fraction with a particle size of less than 100 μm, generally referred to as dust, usually recovered by dedusting systems;
- a coarse fraction with a particle size comprised between 100 μm and 8 mm.

These by-products are normally considered waste products of the steel making and mining plants and have to be treated as waste with considerable operating costs.

Another disadvantage is the difficulty in collecting, transporting and moving these by-products due to their small particle size.

The presence of high quantities of these by-products, moreover, represents a considerable loss of yield of the steel plant due to the high quantity of iron they contain.

Methodologies and plants to recover by-products deriving from metallurgical plants are also known, which, starting from the by-products based on iron as above and combining these by-products with a reducing agent, and possible other additives or by-products, provide to produce agglomerated products, such as pellets and/or briquettes that are simpler to manage, transport and move.

These agglomerated products, if brought to determinate temperatures and under determinate conditions, can establish reduction reactions in which the iron oxides are reduced to metallic iron that can be recovered.

Usually, these agglomerated products are used to feed reactors for the production of iron, such as blast furnaces, or direct reduction plants.

For example, patent documents JP2008095177A and US2004/025633 describe an agglomerated product obtained by agglomeration of ferrous materials and carbon by means of a hydraulic binder, that is, cement, usable in blast furnaces.

Patent document EP0976843 is also known, which describes a method for the cold preparation of briquettes based on iron and carbon oxides in the absence of alkaline binders.

These methods, however, are not very efficient and do not guarantee an efficient recovery of the metallic iron present in the iron oxides of the by-products if these are subsequently used as a charging material for traditional electric arc furnaces.

Moreover, these methodologies typically use carbon in a substantially stoichiometric or slightly higher quantity, running the risk of subtracting carbon from the traditional melting process that occurs in an electric arc furnace.

Moreover, these agglomerated products, typically providing single hydraulic binders such as cement or quicklime, do not have high mechanical properties and may not be suitable for the efficient use in an electric arc furnace.

One purpose of the present invention is to provide agglomerated products based on iron oxides with increased mechanical characteristics which can be easily moved, stored and transported.

It is also a purpose of the present invention to provide an agglomerated product that can be used efficiently and with high yields also as a charging material for electric arc furnaces.

Another purpose of the present invention is to recover both the fine fraction and the coarse fraction of the by-products of the iron working in order to produce agglomerated products based on iron oxide so as to reduce their dispersion in the environment and reduce the waste of material optimizing the resources available.

It is also a purpose of the present invention to provide agglomerated products based on iron oxides that optimize the reduction reaction performed by the reducing agent with consequent maximization of the metallic iron obtainable from the iron oxides present in the by-products.

The Applicant has devised, tested and embodied the present invention to overcome the shortcomings of the state of the art and to obtain these and other purposes and advantages.

DISCLOSURE OF THE INVENTION

The present invention is set forth and characterized in the independent claims. The dependent claims describe other characteristics of the invention or variants to the main inventive idea.

In accordance with the above purposes, a solid agglomerated product according to the present invention can be used as a charging material for an electric arc furnace.

The solid agglomerated product comprises:
- at least one fraction of by-product deriving from a steel plant and comprising a first part containing ferrous oxide FeO and a second part containing ferric oxide $Fe_2O_3$;
- a fraction of solid fuel containing a quantity of carbon C_fix;
- at least one inorganic binder at least partly comprising slag in order to agglomerate the at least one fraction of by-product and the fraction of solid fuel with each other and to give the agglomerated product the required mechanical properties.

According to the present invention, the slag can be white slag, or black slag, or a combination of the two, in any proportion whatsoever.

According to one aspect of the present invention, the fraction of solid fuel is present in a quantity in weight determined by the formula CR=K*CS/C_fix, wherein:
- K: is a constant comprised between 1.2 and 2.5;
- CS: is a quantity of stoichiometric carbon in weight defined by the formula CS=0.11*($Fe^{2+}$_tot)+0.16*($Fe^{3+}$_tot), where $Fe^{2+}$_tot is a quantity in weight of iron contained in the first part, and $Fe^{3+}$_tot is a quantity in weight of iron contained in the second part.

The solid agglomerated product based on iron oxides, as defined above, can be used directly as a charging material for an electric arc furnace to recover the iron contained therein. This product is not reintroduced into reduction reactors, blast furnaces, direct reduction plants (DRP) or suchlike, as normally occurs in the state of the art.

Thanks to the particular composition, and in particular to the quantity of carbon present in the agglomerated product, it is possible to obtain a self-reducing product which, once inserted in the electric arc furnace, is reduced to metallic iron thanks to the high temperatures present and can be recovered as a liquid metal, increasing the overall yield of the melting.

The solid agglomerated product based on iron oxides can also be used in an electric arc furnace that uses scrap, or direct reduced iron (DRI) as charging material.

Furthermore, the solid agglomerated product allows to recover by-products or residues of ferrous fractions from different production processes in the iron and steel industry, for example from fume plants or direct reduction plants, and re-use them directly at the same production site where the by-products were generated.

This greatly simplifies the management of these by-products that are no longer considered as waste residues but as a further source of iron.

The present invention also concerns a method to produce a solid agglomerated product comprising:
- making available at least one fraction of by-product comprising a first part containing ferrous oxide FeO and a second part containing ferric oxide $Fe_2O_3$;
- making available a fraction of solid fuel containing a quantity of carbon C_fix;
- mixing at least the fraction of by-product with the fraction of solid fuel and with at least one inorganic binder, at least partly comprising slag, in order to obtain the solid agglomerated product, According to one aspect of the present invention, before the mixing the method comprises determining a quantity in weight of the fraction of solid fuel by means of the formula CR=K*CS/C_fix, wherein:
- K: is a constant comprised between 1.2 and 2.5;
- CS: is a quantity of stoichiometric carbon in weight defined by the formula CS=0.11*($Fe^{2+}$_tot)+0.16*($Fe^{3+}$_tot), where $Fe^{2+}$_tot is a quantity in weight of iron contained in the first part, and $Fe^{3+}$_tot is a quantity in weight of iron contained in the second part.

Embodiments of the present invention also concern the use of an agglomerated product as defined above as a charging material for an electric arc furnace.

DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DESCRIPTION OF EMBODIMENTS

Figure 1:
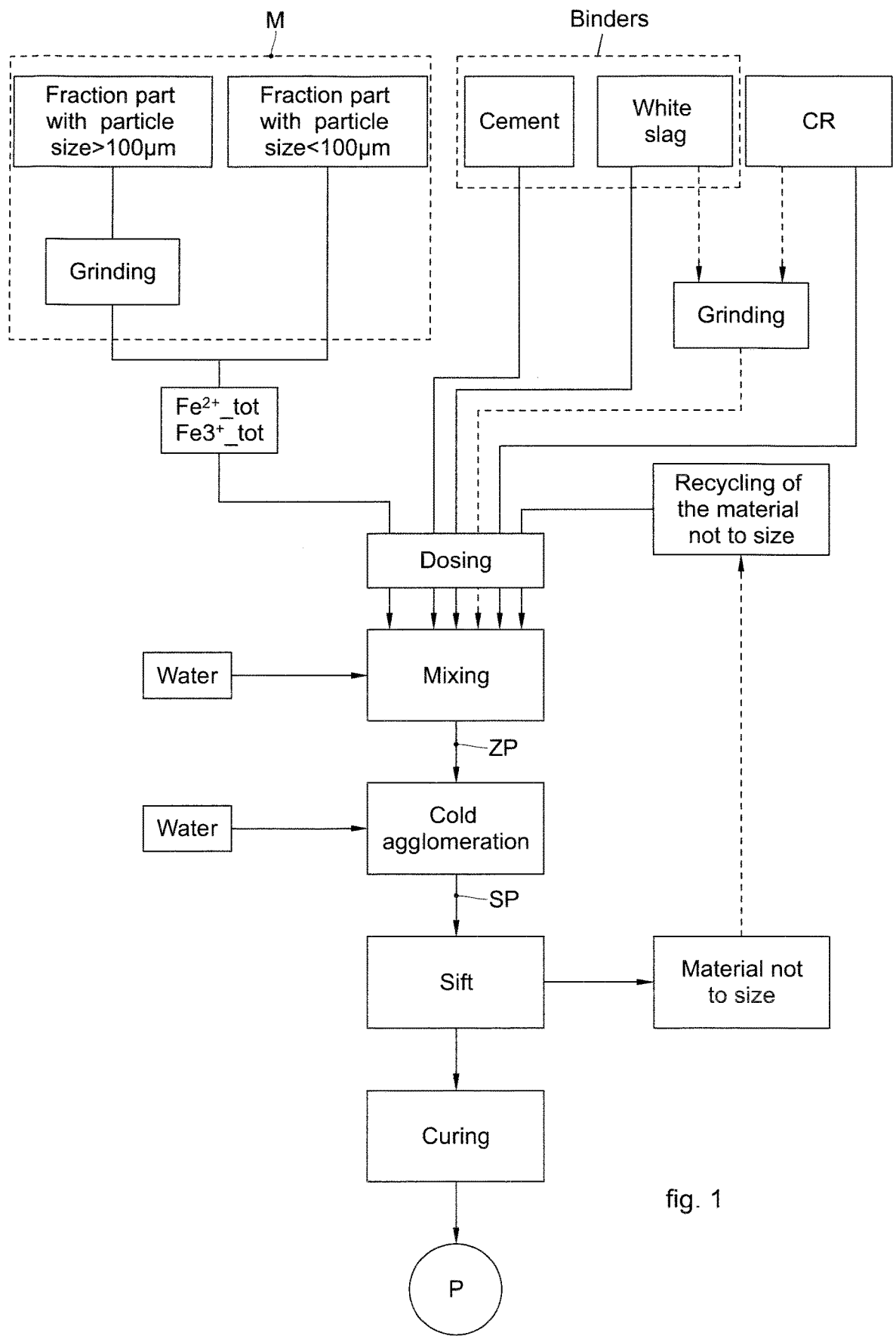
FIG. 1 is a schematic representation of a method to produce a solid agglomerated product based on iron oxides according to the present invention.

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

In accordance with embodiments of the present invention, the solid agglomerated product, according to the present invention, comprises:
- at least one fraction of by-product, which hereafter will be referred to with the following references M, M1, M2, M3 and which comprises a first part containing ferrous oxide FeO and a second part containing ferric oxide $Fe_2O_3$;
- a fraction of solid fuel CR containing a quantity of carbon C_fix;
- at least one inorganic binder, at least partly comprising slag, to agglomerate the at least one fraction of by-product M, M1, M2, M3 and the fraction of solid fuel CR with each other and to give the agglomerated product the required mechanical properties.

The at least one fraction of by-product M, M1, M2, M3 is suitably mixed and combined with the fraction of solid fuel CR, in order to obtain the agglomerated product as above usable as a material to feed an electric arc furnace, or possibly other types of steel plants.

According to a possible solution, the fraction of solid fuel can be chosen in a group comprising anthracite, coke, breeze, pet coke, or suchlike.

In accordance with one aspect of the present invention, the quantity of carbon C_fix is the percentage of non-volatile, that is, fixed, carbon present in the fraction of solid fuel. The quantity of carbon C_fix can be determined as the ratio between the weight of non-volatile carbon and the total weight of the fuel containing this quantity of carbon.

According to possible embodiments of the invention, the quantity of carbon C_fix can be measured by means of experimentation and/or known measurement methods.

The quantity of carbon C_fix contained in the fraction of solid fuel CR acts as a reducing agent subtracting oxygen from the first part containing ferrous oxide FeO and from the second part containing ferric oxide $Fe_2O_3$.

In particular, the reduction reactions of the ferrous oxide FeO and the ferric oxide $Fe_2O_3$ are described by the following formula:

$$2\ Fe_2O_3 + 3\ C = 4\ Fe + 3\ CO_2(g)$$
$$2\ FeO + C = 2\ Fe + CO_2(g)$$
$$Fe_2O_3 + 3\ C = 4\ Fe + 3\ CO(g)$$
$$FeO + C = Fe + CO(g)$$

The products of the reduction reactions are metallic iron Fe and carbon oxides in gaseous form.

From these formulas it is possible to determine the quantity of stoichiometric carbon CS in weight necessary for a correct and balanced reduction reaction:

$$CS = (Fe^{2+}\_tot)*1/2*(PM\_C/PM\_Fe) + (Fe^{3+}\_tot)*3/4*(PM\_C/PM\_Fe)$$

wherein:
- $Fe^{2+}\_tot$: is a quantity in weight of iron contained in the first part containing ferrous oxide FeO;
- $Fe^{3+}\_tot$: is a quantity in weight of iron contained in the second part containing ferric oxide $Fe_2O_3$;
- PM_C: is the atomic weight of carbon C, equal to 12;
- PM Fe: is the atomic weight of iron Fe equal to 55.8.

Consequently, the stoichiometric reduction reaction as above can be simplified and approximated as follows:

$$CS = 0.11*(Fe^{2+}\_tot) + 0.16*(Fe^{3+}\_tot)$$

According to one aspect of the present invention, it is provided that the fraction of solid fuel CR which is provided in the agglomerated product is present in a quantity in weight determined by the formula CR=K*CS/C_fix, wherein:
- K: is a constant comprised between 1.2 and 2.5, preferably comprised between 1.3 and 1.6;
- CS: is a quantity of stoichiometric carbon CS in weight as defined above.

The correlation on the quantity of the fraction of solid fuel CR present in each agglomerated product allows the suitable balancing between the quantity of solid fuel and the quantity of iron oxides, whether they are FeO or $Fe_2O_3$. Moreover, the correlation as above allows to determine the quantity of the fraction of solid fuel that has to be present in the agglomerated product, necessary to provide an energy contribution able to promote the reduction kinetics during the melting in an electric arc furnace.

The agglomerated product thus obtained can therefore be used directly as a charging product of an electric arc furnace because, thanks to its balancing of reducing agent and iron oxides, it receives part of the energy necessary for its reduction from the fuel itself, for the production of liquid metal.

According to a further embodiment, the quantity of the fraction of solid fuel CR is less than or equal to 30% in weight with respect to the at least one fraction of by-product M, M1, M2, M3. This value of solid fuel CR proves to be a good compromise between the ease of obtaining the agglomerated product and the cost of producing it.

According to a further embodiment, the quantity of the fraction of solid fuel CR is less than or equal to 25% in weight with respect to the total weight of the solid agglomerated product.

According to one embodiment, the slag can comprise white slag and/or black slag.

In particular, a preferred solution provides that only white slag is used, since it contains a greater concentration of hydraulic binders (for example lime) than black slag and is therefore better suited to the agglomeration bond.

In accordance with a possible embodiment of the present invention, the inorganic binder comprises slag combined with cement.

The use of slag, white and/or black, which can be classified as an alkaline binder, increases the effectiveness of the agglomeration bond, making the pressed products more compact with increased efficiency in the subsequent use in the EAF. There is also an economic advantage since the slag can be obtained at low cost as a working waste According to a possible solution, the cement, if present, is in a percentage in weight comprised between 6% and 14%, preferably between 8% and 12%, with respect to the at least one fraction of by-product M, M1, M2, M3.

In accordance with possible solutions, the cement can comprise Portland cement, preferably type III.

In accordance with another solution of the present invention, the slag is present in a percentage in weight comprised between 2% and 10%, preferably between 5% and 9%, with respect to the at least one fraction of by-product M, M1, M2, M3.

White slag can be defined as the slag that is obtained as waste from secondary metallurgy processes, for example the steel refining processes that are usually implemented inside the ladle.

Black slag can be defined as the slag that is obtained as waste from the melting process in an electric arc furnace.

The addition of slag during the step of producing the solid agglomerated product advantageously allows to improve the mechanical properties of the agglomerate itself producing an acicular type structure of calcium silicate hydrate, and allows to increase the hygroscopicity of the agglomerate itself in order to retain the water necessary for the hydration of the cement, if present.

Moreover, the addition of slag allows to reduce the necessary quantity of cement or similar binder with respect to the state of the art, and to modulate the basicity of the slag in the furnace, possibly reducing the additions of slagging agents.

In accordance with possible solutions, the agglomerated product can comprise at least one additive chosen in a group comprising calcium oxide CaO, also called "quicklime", and calcium carbonate $CaCO_3$.

According to a possible solution, the solid agglomerated product, in accordance with the present invention, does not contain bentonite and/or organic binders, such as for example molasses, as main binders.

In fact, these materials give the agglomerated product poor mechanical properties if it is brought to temperatures above 400° C. It is also a possible purpose of the present invention to obtain an agglomerated product that preserves its characteristics of mechanical resistance at temperatures higher than 400° C., preferably higher than 600° C. This, for example, makes the addition of these aggregate products to the pre-heated direct reduction iron, usually at temperatures of around 600° C., possible.

The solid agglomerated product can be a pressed product, possibly extruded, having a circular, rectangular, polygonal or also triangular cross-section, or similar and comparable cross-section.

In particular, the solid agglomerated product can be a product obtained by extrusion.

According to some embodiments, the solid agglomerated product can be in the form of pellets P. Each pellet P can advantageously have sizes comprised between 8 mm and 25 mm and weight comprised between 4 gr and 25 gr. These sizes and weight of the pellets allow in fact to obtain an agglomerated product that is particularly suitable to be used to feed electric arc furnaces. This weight and sizes, greater than the solutions typically known, in fact, as well as facilitating and simplifying the production of the pellets, allow the latter, once inserted in the furnace, to be able to easily reach the metal bath and not remain on the surface, for example above the slag.

If producing pellets P, the production method shown schematically in FIG. 1 provides to use a single fraction of by-product M having a particle size of less than 100 μm.

The single fraction of by-product M can be supplied by a single zone of the steel plant in which the fraction was produced or derive from different parts of a steel plant.

Moreover, it can be provided that the single fraction of by-product M is also derived from a prior process of grinding and mixing several fractions of by-product having much larger particle sizes than those used for the production process of the pellets P.

Preferably, it is provided that at least 50% of the fraction of by-product M has a particle size of less than 25 μm.

According to one variant embodiment, it is provided that at least 80% of the fraction of by-product M has a particle size smaller than 45 μm.

In accordance with this solution, it can be provided that in the event at least part of the fraction of by-product has a particle size greater than 100 μm, this part, or the entire fraction of by-product, is subjected to a grinding process in order to obtain the desired particle sizes.

Subsequently, the method provides to determine, for example by means of laboratory tests, the quantity $Fe^{2+}\_tot$ in weight of iron contained in the first part containing ferrous oxide FeO, and the quantity $Fe^{3+}\_tot$ in weight of iron contained in the second part containing ferric oxide $Fe_2O_3$.

By way of example only, it can be provided that the weight of the quantity $Fe^{2+}\_tot$ and of the quantity $Fe^{3+}\_tot$ can be determined by the formulas:

$$Fe^{2+}\_tot = \% \ Fe^{2+}\_M * M$$
$$Fe^{3+}\_tot = \% \ Fe^{3+}\_M * M.$$

Wherein M is the weight of the fraction of by-product and % $Fe^{2+}\_M$ and % $Fe^{3+}\_M$ are the respective percentages of iron $Fe^{2+}$, $Fe^{3+}$ present in the fraction of by-product.

According to some embodiments, % $Fe^{2+}\_M$ and % $Fe^{3+}\_M$ can be measured by means of experimentation and/or measurement methods.

According to a possible solution, it can be provided that the fraction of by-product M has a degree of metallization, that is, a degree of metallic iron, with respect to the total iron, comprised between 15% and 40%.

According to a possible solution, the predisposition at least of the fraction of solid fuel CR and of the at least one binder is subsequently provided. The quantity of the fraction of solid fuel CR is determined according to the formulas described above.

In accordance with a possible solution, the binders, or part of them, and the fraction of solid fuel CR, or part of it, can be subjected to a grinding process in order to reduce their particle size, for example to a value lower than 100 μm.

Subsequently, the fraction of by-product, the binders and the fraction of solid fuel CR are mixed together with the addition of water to obtain a mixture ZP.

According to one embodiment, a dosing of the at least one inorganic binder, of the solid fuel fraction CR and of the fraction of by-product M can be performed before the mixing.

The method to produce the pellets P then provides the agglomeration or cold pelletizing of the mixture ZP in order to obtain agglomerates SP.

Cold agglomeration can be performed by means of a rotating pelletizer disk. Thanks to the rotation of the pelletizer disk combined with the cohesion and plasticity of the fraction of by-product, and thanks to the addition of a correct quantity of water, it is possible to form spherical nuclei which grow progressively during the rotation of the pelletizer disk and are subsequently discharged in the form of agglomerates SP of substantially spherical sizes.

Subsequently, the method can comprise a sifting step during which the agglomerates SP are sifted, keeping only those having a certain size.

The agglomerates SP with sizes smaller than those desired are recycled, for example introducing them into the mixer during the mixing step, or into the pelletizer disk or drum.

Following the sorting, the method can comprise a curing step. During this curing step, the agglomerates SP acquire the desired mechanical characteristics of the pellet P, also thanks to the hydration reactions that occur between the binders, for example between cement and slag.

According to a variant, the solid agglomerated product can be in the form of briquettes B. The briquettes B can have sizes comprised between 20 mm and 60 mm and a weight comprised between 15 g and 300 g.

Figure 2:
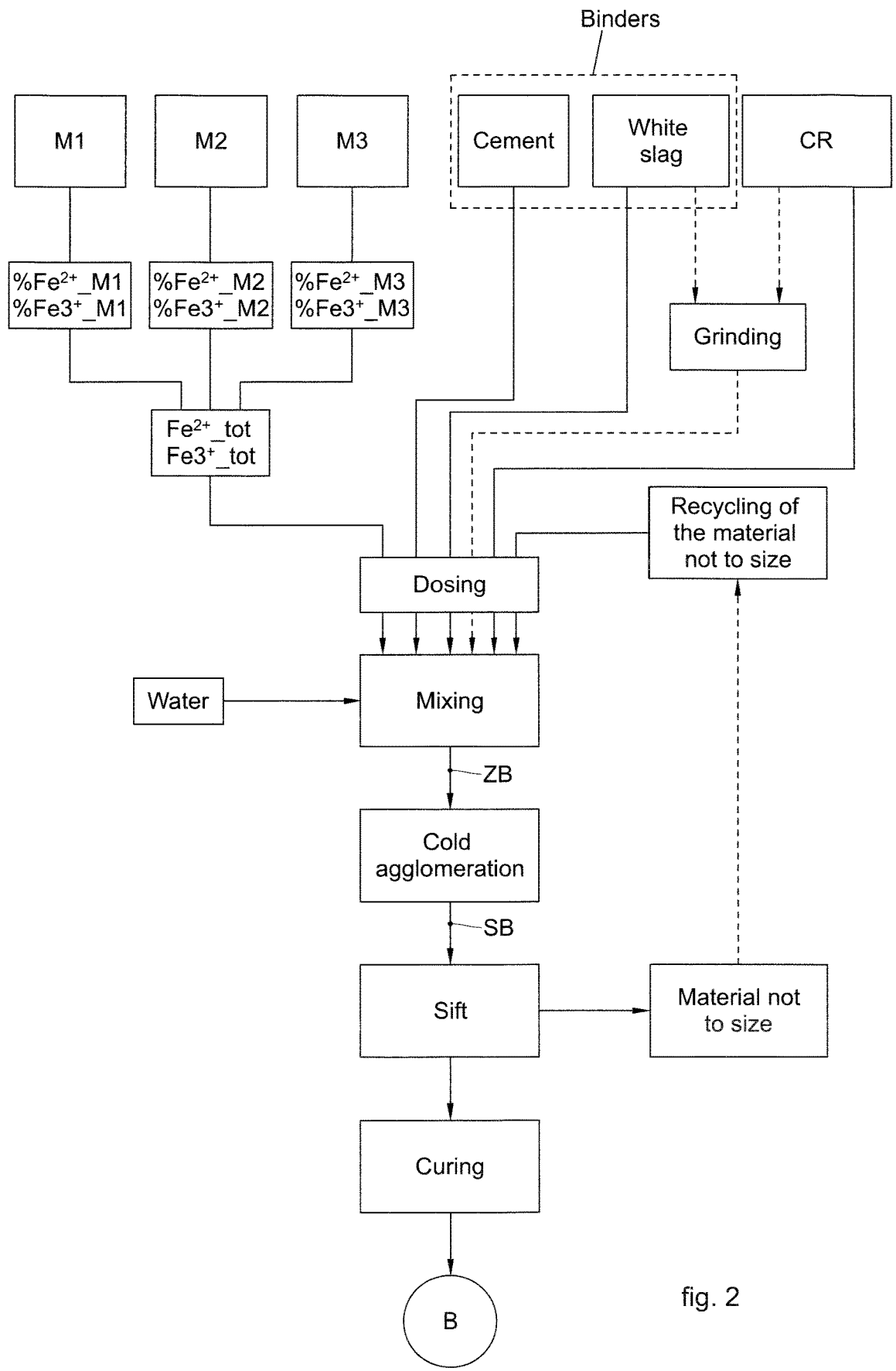
FIG. 2 is a schematic representation of a method to produce another solid agglomerated product based on iron oxides according to the present invention.

If producing briquettes B, the production method shown schematically in FIG. 2 provides to supply at least two fractions of by-product, in this case three fractions of by-product M1, M2 and M3, wherein at least a first fraction of by-product has a particle size of less than 100 μm, and a second fraction of by-product, in this case a second and a third particle size of by-product M2 and M3, has a particle size comprised between 100 μm and 8 mm, preferably between 100 μm and 4 mm for at least 80% of the by-product itself.

Preferably, it is provided that at least 50% of the first fraction of by-product M1 has a particle size of less than 25 μm.

According to a possible solution, it can be provided that the first fraction of by-product M1 has a degree of metallization, that is, a degree of reduction of the iron oxides (FeO and/or $Fe_2O_3$) to metallic iron comprised between 15% and 40%.

According to a further embodiment, it can be provided that the second fraction of by-product M2 has a degree of metallization, that is, a degree of reduction of the iron oxides (FeO and/or $Fe_2O_3$) to metallic iron lower than 6%.

In accordance with another embodiment, it can be provided that the third fraction of by-product M3 has a degree of metallization, that is, a degree of reduction of the iron oxides (FeO and/or $Fe_2O_3$) to metallic iron comprised between 70% and 100%.

In accordance with possible implementations of the method, it is then provided to determine, for all the fractions of by-product M1, M2, M3, for example by means of laboratory tests, the quantity of $Fe^{2+}\_tot$ in weight of iron contained in the first part containing ferrous oxide FeO and the quantity of $Fe^{3+}\_tot$ in weight of iron contained in the second part containing ferric oxide $Fe_2O_3$.

The determination can be performed separately for each one of the fractions of by-product M1, M2, and M3.

By way of example only, for the example case in which three fractions of by-product are present, it is provided to determine, for example by means of laboratory tests, the respective percentages of iron $Fe^{2+}$, $Fe^{3+}$ present in each fraction of by-product, that is, to determine % $Fe^{2+}\_{M1}$, % $Fe^{3+}\_{M1}$, % $Fe^{2+}\_{M2}$, % $Fe^{3+}\_{M2}$, % $Fe^{2+}\_{M3}$, % $Fe^{3+}\_{M3}$.

As a function of the percentages of iron $Fe^{2+}$, $Fe^{3+}$ it is possible to determine the weights of the quantity $Fe^{2+}\_tot$ and of the quantity $Fe^{3+}\_tot$ by means of the formulas:

$$Fe^{2+}\_tot = \% \ Fe^{2+}\_{M1}*M1 + \% \ Fe^{2+}\_{M2}*M2 + \% \ Fe^{2+}\_{M3}*M3$$
$$Fe^{3+}\_tot = \% \ Fe^{3+}\_{M1}*M1 + \% \ Fe^{3+}\_{M2}*M2 + \% \ Fe^{3+}\_{M3}*M3.$$

These quantities in weight are then used to determine the weight of the fraction of solid fuel CR to be added in order to obtain the briquettes B.

It is provided to supply the at least one inorganic binder that binds the fractions of by-product M1, M2, M3 and the fraction of solid fuel CR together.

It can also be provided that, as for the method to produce the pellets, the binders, or part of them, and the fraction of solid fuel CR, or part of it, can be subjected to a grinding process to reduce their particle size, for example to a value smaller than 100 μm.

Subsequently, the fractions of by-product M1, M2 and M3, the binders and the fraction of solid fuel CR are mixed together with the addition of water to obtain a mixture ZB.

According to one embodiment, a dosing of the at least one inorganic binder, of the fraction of solid fuel CR and of the fractions of by-product M1, M2, M3 can be performed before the mixing.

The method to produce the briquettes B then provides the cold agglomeration or briquetting of the mixture ZB in order to obtain agglomerates SB.

The cold agglomeration can be performed by pressing, for example with the aid of a mechanical compacting cycle at high pressures.

By way of example only, the mixture ZB can be fed into the space between two counter-rotating rollers. The rollers are provided with molds on their surface. When the mixture ZB passes between the rollers, the material is compacted, and the briquettes are formed with the desired shapes and sizes.

Subsequently, the method can comprise a sifting step during which briquettes exiting from the cold agglomeration are sifted, keeping only those that have a determinate size.

Briquettes with smaller sizes than those desired are recycled, for example introducing them again into the mixer during the mixing step, or into the briquetting machine.

After the sorting, the method can comprise a curing step. During this curing step, the briquettes B assume the desired mechanical properties thanks also to the hydration reactions that occur between the binders, for example between cement and slag.

The table shows examples of formulations of the solid agglomerated products as a percentage in weight when dry, that is, without the addition of water.

| Iron oxides % | Fraction of solid fuel % | Cement % | Slag % |
|---|---|---|---|
| 74.6 | 11.2 | 7.7 | 6.4 |
| 75.6 | 11.3 | 7.0 | 6.1 |

In accordance with another aspect of the present invention, it is provided that after the curing, the pellets P have a compressive strength, that is, a compression weight that supports the pellet before collapsing, greater than 300 N/pellet.

Furthermore, it can be provided that the pellets P, obtained according to the method described above, have a "drop test", that is, a capacity to resist repeated drops from a determinate height, which is greater than 20 drops.

According to another aspect of the present invention, it is provided that after the curing the briquettes B have a compressive strength, that is, a compression weight that supports the briquette before collapsing, greater than 1200 N/briquette.

It is clear that modifications and/or additions of parts may be made to the solid agglomerated product as described heretofore, without departing from the field and scope of the present invention.

It is also clear that, although the present invention has been described with reference to some specific examples, a person of skill in the art shall certainly be able to achieve many other equivalent forms of solid agglomerated product, having the characteristics as set forth in the claims and hence all coming within the field of protection defined thereby.

The invention claimed is:

1. Solid agglomerated product usable as a charge material for an electric arc furnace, said solid agglomerated product comprising:
   at least one fraction of by-product deriving from a steel plant and comprising a first part containing ferrous oxide FeO and a second part containing ferric oxide $Fe_2O_3$;
   a fraction of solid fuel (CR) containing a quantity of carbon (C_fix);
   at least one inorganic binder to agglomerate said at least one fraction of by-product and said fraction of solid fuel (CR) with each other and to give the agglomerated product the required mechanical properties;
   wherein said fraction of solid fuel (CR) is present in a quantity in weight determined by the formula CR=K*CS/C_fix, wherein:
   K: is a constant comprised between 1.2 and 2.5;
   CS: is a quantity of stoichiometric carbon in weight defined by the formula CS=0.11* ($Fe^{2+}\_tot$)+0.16* ($Fe^{3+}\_tot$), where $Fe^{2+}\_tot$ is a quantity in weight of iron contained in said first part, and $Fe^{3+}\_tot$ is a quantity in weight of iron contained in said second part, wherein the inorganic binder at least partly comprises slag.

2. Product as in claim 1, wherein the slag comprises white slag.

3. Product as in claim 1, wherein the slag comprises black slag.

4. Product as in claim 1, wherein the at least one inorganic binder comprises slag combined with cement.

5. Product as in claim 4, wherein said cement is present in a percentage in weight comprised between 6% and 14% with respect to said at least one fraction of by-product.

6. Product as in claim 4, wherein said slag is present in a percentage in weight comprised between 2% and 10% with respect to said at least one fraction of by-product.

7. Product as in claim 1, wherein the agglomerated product comprises at least one additive selected from a group consisting of calcium oxide CaO, and calcium carbonate $CaCO_3$.

8. Product as in claim 1, wherein the product is in the form of pellets.

9. Product as in claim 1, wherein the product is in the form of briquette.

10. Product as in claim 1, wherein the product is a product obtained by extrusion.

11. Method to produce a solid agglomerated product comprising:
    making available at least one fraction of by-product comprising a first part containing ferrous oxide FeO and a second part containing ferric oxide $Fe_2O_3$;
    making available a fraction of solid fuel (CR) containing a quantity of carbon C_fix;
    mixing at least said fraction of by-product with said fraction of solid fuel (CR) and with at least one inorganic binder in order to obtain said solid agglomerated product,
    wherein before said mixing, the method comprises determining a quantity in weight of said fraction of solid fuel (CR) by means of the formula CR-K*CS/C_fix, wherein:
    K: is a constant comprised between 1.2 and 2.5;
    CS: is a quantity of stoichiometric carbon in weight defined by the formula CS=0.11*($Fe^{2+}$_tot)+0.16*($Fe^{3+}$_tot), where $Fe^{2+}$_tot is a quantity in weight of iron contained in said first part, and $Fe^{3+}$_tot is a quantity in weight of iron contained in said second part, wherein the inorganic binder at least partly comprises slag.

12. Method as in claim 11, wherein the slag comprises black or white slag.

13. Method as in claim 11, wherein the at least one inorganic binder comprises slag combined with cement.

14. Method as in claim 11, wherein during said mixing the method provides to add at least one additive selected from a group consisting of calcium oxide CaO, and calcium carbonate $CaCO_3$.

15. Method as in claim 11, wherein the method comprises the production of pellets, a single fraction of by-product is made available before mixing with a particle size smaller than 100 μm.

16. Method as in claim 11, wherein the method comprises making briquettes, a first fraction of by-product having a particle size of less than 100 μm and at least a second fraction of by-product having a particle size comprised between 100 μm to 8 mm are made available.

17. Product as in claim 4, wherein said cement is present in a percentage in weight comprised between 8% and 12% with respect to said at least one fraction of by-product.

18. Product as in claim 4, wherein said slag is present in a percentage in weight comprised between 5% and 9% with respect to said at least one fraction of by-product.

* * * * *

UNITED STATES PATENT AND TRADEMARK OFFICE
CERTIFICATE OF CORRECTION

PATENT NO. : 12,247,265 B2
APPLICATION NO. : 17/280706
DATED : March 11, 2025
INVENTOR(S) : Selena Tiburzio et al.

It is certified that error appears in the above-identified patent and that said Letters Patent is hereby corrected as shown below:

In the Claims

Column 10, Claim 1, Line 44, remove:
defined by the formula $CS=0.11*(Fe_{2+}\_tot)+0.16*$ Insert:
--defined by the formula $CS=0.11*(Fe^{2+}\_tot)+0.16*$--

Column 11, Claim 11, Line 17, remove:
(CR) by means of the formula CR-K*CS/C_fix, Insert:
--(CR) by means of the formula CR=K*CS/C_fix,--

Signed and Sealed this
Twentieth Day of May, 2025

Coke Morgan Stewart
*Acting Director of the United States Patent and Trademark Office*